United States Patent [19]
Ketchpel, Jr. et al.

[11] 3,802,079
[45] Apr. 9, 1974

[54] SAW BLADE HOLDER FOR PORTABLE RECIPROCATING SAW

[75] Inventors: Paul A. Ketchpel, Jr., Simsbury, Conn.; Kestutis Damijonaitis, New Bern, N.C.

[73] Assignee: The Stanley Works, New Britain, Conn.

[22] Filed: May 15, 1972

[21] Appl. No.: 253,597

[52] U.S. Cl............ 30/376, 30/394, 279/44
[51] Int. Cl................................ B27b 11/06
[58] Field of Search............ 30/392, 393, 394, 375, 30/390, 376; 83/699; 279/83, 44, 76

[56] References Cited
UNITED STATES PATENTS

| | | | |
|---|---|---|---|
| 2,906,304 | 9/1959 | Levine | 30/375 |
| 3,528,463 | 9/1970 | Mejia | 30/392 |
| 3,155,128 | 11/1964 | Godfrey | 30/394 X |
| 3,542,097 | 11/1970 | Dudek | 30/392 |
| 3,028,890 | 4/1962 | Atkinson | 83/699 X |
| 1,984,500 | 12/1934 | Tautz | 279/83 X |
| 2,735,685 | 2/1956 | Karr | 279/44 |
| 3,721,142 | 3/1973 | Csaki | 30/390 |

FOREIGN PATENTS OR APPLICATIONS
571,935  3/1959  Canada.................. 30/392

*Primary Examiner*—Harold D. Whitehead
*Assistant Examiner*—J. C. Peters
*Attorney, Agent, or Firm*—Prutzman, Hayes, Kalb & Chilton

[57] ABSTRACT

An elongated portable reciprocating saw having a rear spade handle, a forwardly projecting tubular slide with a saw blade holder in the forward end thereof for angular adjustment about an axis angularly offset from the axis of the slide and an elongated saw blade with an end tang angularly offset from the axis of the saw blade and such that the saw blade may be set in either a horizontal or vertical position by angularly positioning the saw blade holder on the slide and the saw blade may be mounted on the blade holder in two reverse positions with the saw blade at different inclinations.

3 Claims, 6 Drawing Figures

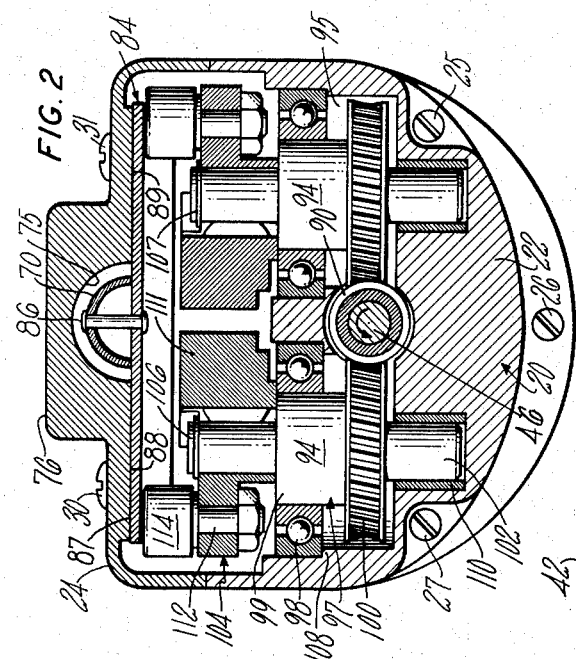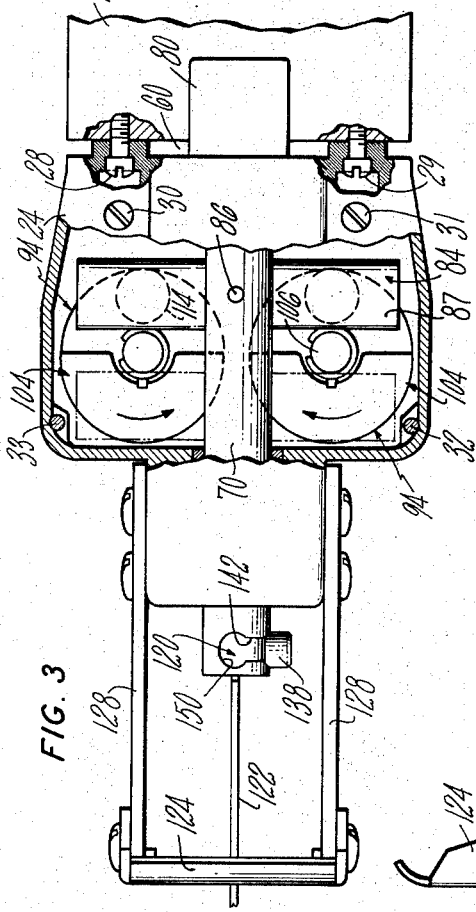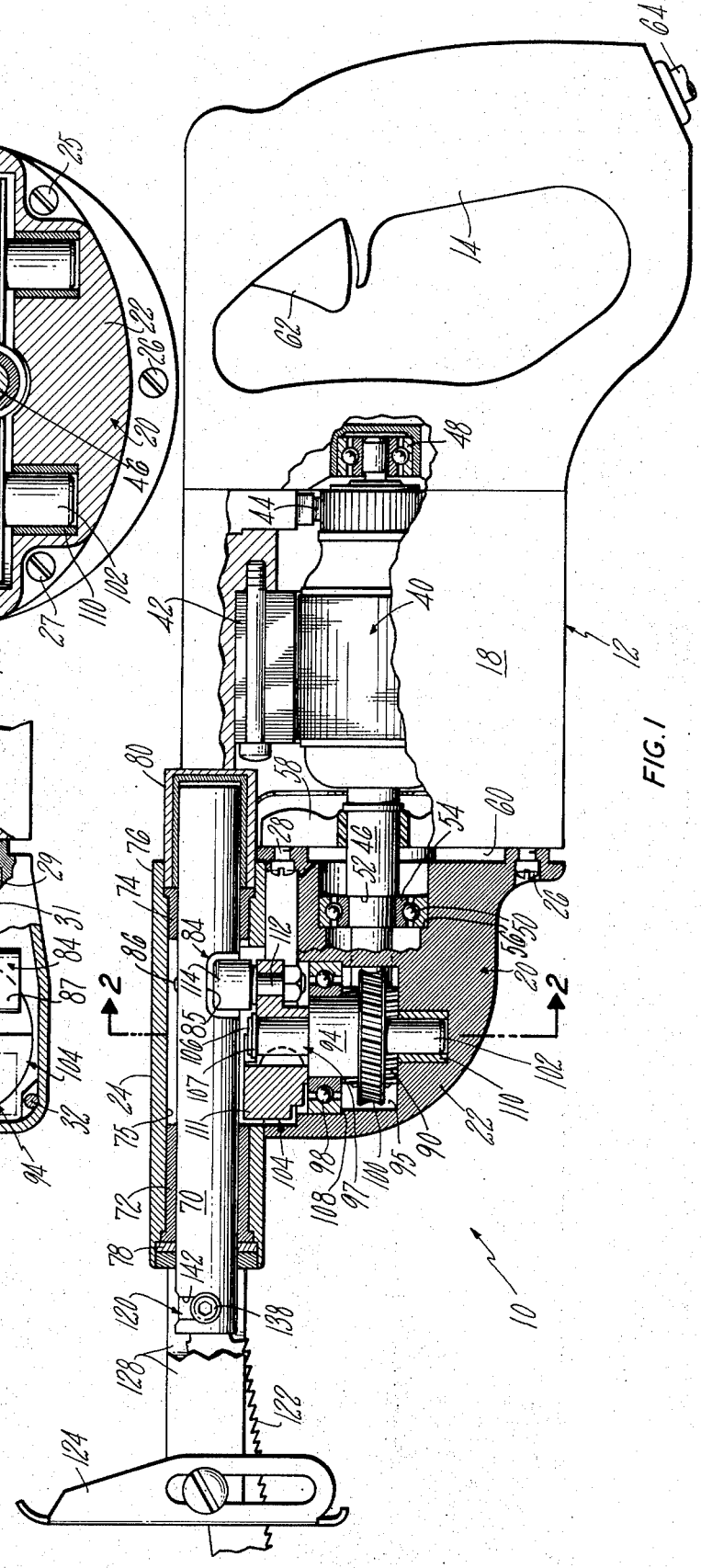

3,802,079

SAW BLADE HOLDER FOR PORTABLE RECIPROCATING SAW

BRIEF SUMMARY OF THE INVENTION

The present invention relates generally to portable reciprocating saws and more particularly to a new and improved saw blade holder for a portable reciprocating saw.

It is a primary aim of the present invention to provide a new and improved adjustable saw blade holder for a portable reciprocating saw which will accommodate saw blades having end tangs of various shapes and thicknesses.

It is another aim of the present invention to provide a new and improved saw blade holder for a portable reciprocating saw for selectively holding a saw blade in a vertical position with the saw blade teeth at either the upper or lower edge of the saw blade or in a horizontal position with the saw blade teeth at either the right side or left side of the saw blade.

It is another aim of the present invention to provide a new and improved saw blade holder for a portable reciprocating saw which provides for adjusting the angle of inclination of the saw blade.

It is a further aim of the present invention to provide a new and improved saw holder for a portable reciprocating saw which is angularly adjustable for angularly positioning the blade.

Other objects will be in part obvious and in part pointed out more in detail hereinafter.

A better understanding of the invention will be obtained from the following detailed description and the accompanying drawings of an illustrative application of the invention.

BRIEF DESCRIPTION OF THE DRAWINGS

FIG. 1 is a side view, partly broken away and partly in section, of a portable reciprocating saw incorporating an embodiment of the present invention;

FIG. 2 is an enlarged transverse section view, partly in section, of the portable reciprocating saw taken substantially along line 2—2 of FIG. 1;

FIG. 3 is a partial top view, partly broken away and partly in section, of the portable reciprocating saw;

DESCRIPTION OF THE PREFERRED EMBODIMENT

Figure 4:
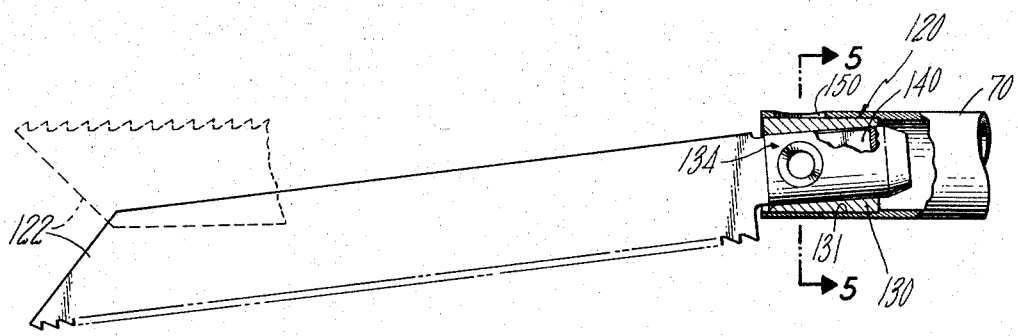
FIG. 4 is an enlarged partial side view, partly broken away and partly in section, of the portable reciprocating saw showing a saw blade and saw blade holder thereof with the saw blade in one operating position in full lines and in part in another operating position in broken lines.
Figure 5:
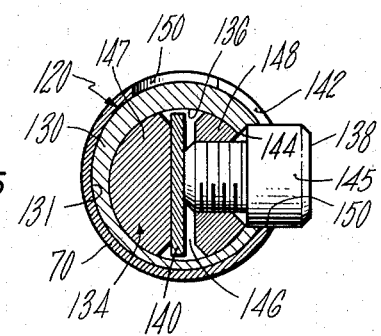
FIG. 5 is an enlarged transverse section view, partly in section, of the portable reciprocating saw taken substantially along line 5—5 of FIG. 4.
Figure 6:
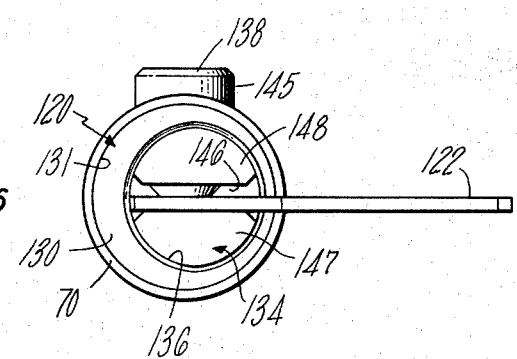
FIG. 6 is an enlarged front end view showing the saw blade and saw blade holder.

Referring now to the drawings in detail wherein like numerals represent like parts throughout the several figures, a portable reciprocating saw 10 incorporating an embodiment of the present invention is shown comprising an elongated multipart housing 12 having a rear spade handle member 14, a cylindrical motor housing 18 and a forward transmission housing 20 with lower and upper housing parts 22, 24. The spade handle 14 and forward housing 20 are suitably secured to the motor housing 18, as for example by suitable screw fasteners 25–29 extending from the forward lower housing part 22 through the central housing 18 and threaded into the spade handle 14. The upper forward housing part 24 is shown secured to the lower forward housing part 22 by screw fasteners 30—30.

An electric motor 40 is mounted centrally within the housing 12 with its axis coaxial with the cylindrical housing 18. The motor field 42 and commutator brushes 44 are secured within the motor housing 18, and the motor armature shaft 46 is supported on ball bearings 48, 50 mounted on the spade handle 14 and lower forward housing part 22. A shoulder 52 of the motor shaft 46 engages the inner race 54 of the forward ball bearing 50 and the outer race of the bearing 50 engages a shoulder 56 of the housing part 22 to support the shaft 46 against forward axial displacement. A suitable fan 58 is press fit on the shaft 46 for drawing cooling air into the motor housing 18 via passages 60 formed between the forward and central housings 20, 18 and for directing the cooling air around the armature and out suitable outlet openings (not shown). An electric cord 64 is connected to the spade handle and a trigger 62 and trigger operated switch (not shown) are provided in a conventional manner for energizing the electric motor 40.

An elongated tubular plunger or slide 70 is mounted within forward and rear support bushings 72, 74 in the upper forward housing part 24 in overlapping relationship with the motor shaft 46 for rectilinear reciprocable movement parallel to the axis of the shaft 46 and adjacent an upper flat edge 76 of the housing 12. The bushings 72, 74 are mounted within a longitudinally extending bore 75 in the upper forward housing part 24; a suitable lubricant seal 78 is provided at the forward end of the bore 75; and a rear cap and bushing assembly 80 is mounted in the rear end of the bore 75 and received in part in a conforming peripheral pocket in the motor housing 18 for enclosing the rear end of the bore 75.

A cross piece or yoke 84 having a U-shaped cross section is symmetrically mounted on the slide 70 within a conforming transverse slot 85 in the slide and is secured to the slide 70 by a suitable rivet 86. The yoke 84 is mounted with its flat upper surface 87 in sliding engagement with laterally spaced and inwardly facing flat bearing walls 88, 89 on the upper forward housing part 24. As seen in the drawings, the combined slide and yoke are mounted to permit fore and aft movement thereof.

A drive worm 90 is provided on the forward end of the motor shaft 46, and a pair of substantially identical drive assemblies 94 mounted within laterally spaced upwardly bores or pockets 95 in the lower forward housing part 22 are provided for drivingly interconnecting the tubular slide 70 with the drive worm 90. Each drive assembly 94 comprises a shaft 97, a ball bearing 98 mounted on a central bushing 99 on the shaft 97, a worm wheel 100 secured onto a lower end 102 of the shaft 97 in engagement with the drive worm 90, and a crank and counterweight sub-assembly 104 keyed onto an upper end 106 of the shaft 97 and held in position by a retaining ring 107. The lower end 102 of the shaft 97 is supported within a bushing 110, and each drive assembly 94 is suitably retained in its position with the outer race of the bearing 98 in engagement with a locating shoulder 108 of the housing.

The drive worm 90 provides for driving the drive assemblies 94 at the same angular velocity in opposite angular directions and such that there is a balanced forward axial thrust on the motor shaft 46. The axial thrust on the motor shaft 46 maintains the forward shaft bearing 50 in engagement with the housing shoulder 54. The crank and counterweight sub-assembly 104 comprises a counterweight 111 keyed onto the shaft 97, an upstanding crank pin 112 secured onto the counterweight 111 and a cylindrical roller 114 mounted on the crank pin 112 for rolling contact with the internal parallel sides of the yoke 84. The drive assemblies 94 are mounted for being individually driven by the worm 90 and are symmetrically positioned for smoothly reciprocating the yoke 84 and the tubular slide 70 back and forth as the drive assemblies are simultaneously rotated by the motor 40 via the motor shaft 46 and drive worm 90. Each counterweight 111 provides for dynamically balancing the respective drive assembly 94 to provide for smooth and substantially vibration free operation of the saw.

A saw blade holder 120 is mounted within the forward end of the tubular slide 70 for supporting a saw blade 122 for rectilinear reciprocable movement with the slide 70. A foot 124 is mounted forwardly of the housing 12 by a pair of arms 128 for supporting and guiding the saw blade in a conventional manner. The foot 124 is adapted to be adjusted on the arms 128 in accordance with the application of the saw.

The saw blade holder 120 comprises a cylindrical outer support ring 130 adapted to be rotated within an enlarged cylindrical bore 131 in the forward end of the tubular slide 70, an inner cylindrical blade clamp 134 having a press fit within a cylindrical bore 136 in the support ring 130, and a socket head clamp screw 138 threaded into the blade clamp 134 for engagement with a side face of an inner rectangular end or tang 140 of the saw blade 122. The clamp screw 138 extends through a circumferential slot 142 in the tubular slide 70 and a circular countersunk opening 144 in the support ring 130 dimensioned to closely receive the screw head 145 when the saw blade is clamped in place. The blade clamp 134 has an axially extending diametrical slot 146 (with chamfered axial edges) for receiving the saw blade support tang 140. The saw blade support tang preferably has a width approximately equal to but slightly less than the diameter of the bore 136 to assist in retaining the saw blade against angular movement in the slot 146. Because of the slot 146 the clamp 134 is formed with a forward bifurcated end with spaced generally semi-cylindrical end parts 147, 148. When the clamp screw 138 is tightened against the side of the saw blade tang 140 the clamp ends 147, 148 are forced apart slightly to distort the support ring 130 and thereby assist in clamping the entire holder within the tubular slide 70.

The circumferential slot 142 in the tubular slide 70 has two 90° spaced enlarged circular end openings 150 for closely receiving the enlarged head 145 of the socket screw 138 and to therefore hold the socket screw and blade clamp 134 against angular displacement relative to the slide 70 when the clamp screw 138 is tightened to clamp the saw blade in place. The holder 120 may, however, be readily adjusted 90° on the tubular slide 70 by loosening the clamp screw 138 sufficiently to withdraw the socket head 145 from the opening 150, manually rotating the holder 90° to position the socket head 145 of the clamp screw in alignment with the other opening 150 and tightening the clamp screw.

The openings 150 are positioned so that the saw blade may be selectively positioned in a vertical position (with the saw blade lying in the plane of the spade handle 14 and the saw blade teeth pointed either upwardly or downwardly) or in a horizontal position (with the saw blade in a plane generally perpendicular to the plane of the spade handle 14 and the saw blade teeth on either the right or left side of the saw) merely by properly positioning the saw blade within the holder 120 and properly angularly positioning the saw blade holder within the tubular slide 70.

The cylindrical bore 136 in the support ring 130 is formed so that its axis is angularly offset and diverges forwardly away from the axis of the tubular slide 70, for example at an angle of 4° or 5°. The saw blade support tang 140 is also angularly offset, for example at an angle of 3°, relative to the line of the cutting teeth of the saw blade. The blade tang is angularly offset inwardly and such that with the saw blade in its normal operating position (with the saw blade vertical and its teeth pointed downwardly) the angular offsets of the blade clamp 134 and the saw blade tang 140 are cumulative to provide a positive angular offset of the saw blade of for example 8°. By reversing the saw blade in the saw blade clamp, the angular offsets of the saw blade tang 140 and saw blade clamp 134 are in opposition, and for example the saw blade would have a negative angular offset of 2°. Thus, it can be seen that the saw blade may be selectively positioned at different inclinations and depending on the relative angular offsets used at both positive and negative inclinations.

As will be apparent to persons skilled in the art, various modifications, adaptations, and variations of the foregoing specific disclosure can be made without departing from the teachings of the present invention.

I claim:

1. In a portable reciprocating saw having an elongated saw blade with a cutting edge along a longitudinally extending edge thereof and an end tang, a saw blade support slide mounted for rectilinear reciprocable motion, a saw blade holder on a forward end of the slide for receiving the end tang of the saw blade for supporting the saw blade for extension longitudinally forwardly from the holder, and a motor drive for reciprocating the slide, the improvement wherein the blade holder comprises a generally cylindrical blade support having a generally longitudinally extending slot opening for receiving the end tang of the saw blade, the longitudinally extending slot opening having an axis slightly angularly offset from the axis of rectilinear movement of the slide and the blade support being mounted on the support slide for angular adjustment about the axis of rectilinear reciprocable movement of the slide, securing means for securing the saw blade in the slot opening of the blade support with the saw blade extending longitudinally forwardly from the blade support and for selectively locking the blade support in 90° angularly spaced positions on the saw blade support slide, the blade support slide having a generally cylindrical opening and the blade holder being generally cylindrical and being mounted within the cylindrical opening of the slide for said angular adjustment of the blade support about the axis of rectilinear movement of the slide, the blade support having a pair of spaced blade support parts defining said longitudinally extending slot opening, and the securing means comprising a threaded clamp fastener threaded into one of the spaced blade support parts for engagement with the blade tang for clamping the blade tang within the axially extending slot opening, the threaded clamp fastener having an enlarged circular head and the saw blade support slide having a circumferentially extending slot therein for receiving the clamp fastener and with enlarged generally circular portions for closely receiving the clamp fastener head for angularly securing the saw blade holder to the slide.

2. In a portable reciprocating saw having an elongated saw blade with a cutting edge along a longitudinally extending edge thereof and an end tang, a saw blade support slide mounted for rectilinear reciprocable motion, a saw blade holder on a forward end of the slide for receiving the end tang of the saw blade for supporting the saw blade for extension longitudinally forwardly from the holder, and a motor drive for reciprocating the slide, the improvement wherein the saw blade holder comprises a cylindrical ring mounted on the slide for angular adjustment about an axis substantially parallel to the axis of rectilinear movement of the slide and having an inner bore with an axis slightly angularly offset from the axis of rectilinear movement of the slide, a saw blade support mounted within the support ring bore having a forward bifurcated end with spaced parts forming therebetween a slot opening for receiving the saw blade end tang, and a threaded clamp fastener threaded into one of the spaced blade support parts for engagement with the saw blade tang for clamping the blade tang within the slot opening.

3. A portable reciprocating saw according to claim 2 wherein the slide has a cylindrical opening and the cylindrical ring is mounted within the cylindrical opening of the slide for said angular adjustment about the axis of rectilinear movement of the slide.

* * * * *